United States Patent
Takahashi

(10) Patent No.: US 8,280,575 B2
(45) Date of Patent: Oct. 2, 2012

(54) ABNORMALITY DIAGNOSIS SYSTEM AND CONTROL SYSTEM FOR INTERNAL COMBUSTION ENGINE

(75) Inventor: Tomohiro Takahashi, Kariya (JP)

(73) Assignee: Denso Corporation, Kariya (JP)

( * ) Notice: Subject to any disclaimer, the term of this patent is extended or adjusted under 35 U.S.C. 154(b) by 1173 days.

(21) Appl. No.: 12/073,111

(22) Filed: Feb. 29, 2008

(65) Prior Publication Data

US 2008/0306648 A1 Dec. 11, 2008

(30) Foreign Application Priority Data

Apr. 23, 2007 (JP) ................. 2007-112689

(51) Int. Cl.
*G01M 17/00* (2006.01)
(52) U.S. Cl. .......................................... 701/29
(58) Field of Classification Search .............. None
See application file for complete search history.

(56) References Cited

U.S. PATENT DOCUMENTS

| | | | |
|---|---|---|---|
| 5,408,969 A | 4/1995 | Obaraki et al. | |
| 5,491,631 A | 2/1996 | Shirane et al. | |
| 6,871,633 B1 | 3/2005 | Date et al. | |
| 7,895,824 B2* | 3/2011 | Tsujimura et al. | 60/277 |
| 2005/0103312 A1* | 5/2005 | Uchiyama | 123/457 |
| 2005/0138919 A1* | 6/2005 | Nakano et al. | 60/284 |
| 2005/0205055 A1* | 9/2005 | Shimizu | 123/346 |
| 2006/0218901 A1* | 10/2006 | Tsujimura et al. | 60/289 |
| 2008/0202223 A1* | 8/2008 | Tsujimura et al. | 73/114.31 |
| 2008/0228374 A1* | 9/2008 | Ishizuka et al. | 701/103 |

FOREIGN PATENT DOCUMENTS

| | | |
|---|---|---|
| JP | 5-172705 | 7/1993 |
| JP | 6-213049 A | 8/1994 |
| JP | 6-241128 | 8/1994 |
| JP | 10-103140 | 4/1998 |
| JP | 2005-337031 A | 12/2005 |

OTHER PUBLICATIONS

Japanese Office Action dated Dec. 16, 2008 issued in corresponding Japanese Application No. 2007-112689, with English translation.
Office Action (2 pgs.) dated Sep. 8, 2009 issued in corresponding Japanese Application No. 2007-112689 with an at least partial English-language translation thereof (2 pgs.).

(Continued)

*Primary Examiner* — Thomas Tarcza
*Assistant Examiner* — Nagi Murshed
(74) *Attorney, Agent, or Firm* — Nixon & Vanderhye P.C.

(57) ABSTRACT

An ECU (60) for an engine (10, 70) monitors a change of an actual fuel pressure (NPC), when a target fuel pressure (PFIN) is changed stepwise. In one abnormality, the time required for the actual fuel pressure to reach the target fuel pressure is equal to that when an actuator (34) operates normally. However, the maximum value of a differential value (dNPC/dt) with respect to time of the actual fuel pressure is different from that when the actuator operates normally. For this reason, a normal range is set in advance for the maximum value of the differential value with respect to time of the actual fuel pressure and when the maximum value of the differential value with respect to time of the actual fuel pressure is out of the normal range, it is determined that the actuator operates abnormally.

19 Claims, 10 Drawing Sheets

OTHER PUBLICATIONS

Office Action dated Jun. 12, 2010 issued in corresponding Chinese Application No. 200810087440.X with an at least partial English-language translation thereof.

Japanese Office Action dated Sep. 8, 2009, issued in corresponding Japanese Application No. 2007-112689, with English translation.

* cited by examiner

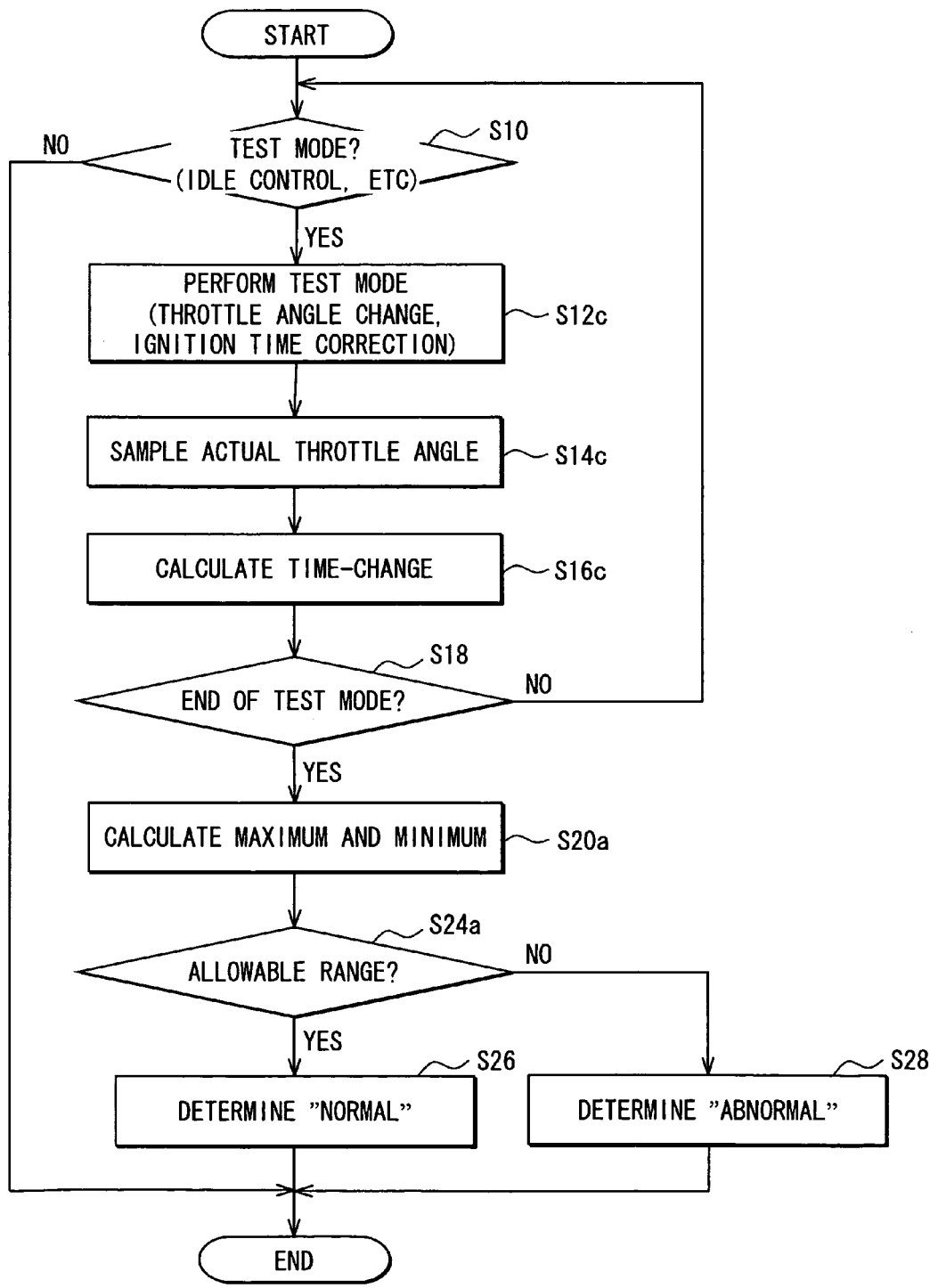

ABNORMALITY DIAGNOSIS SYSTEM AND CONTROL SYSTEM FOR INTERNAL COMBUSTION ENGINE

CROSS REFERENCE TO RELATED APPLICATION

This application is based on and incorporates herein by reference Japanese Patent Application No. 2007-112689 filed on Apr. 23, 2007.

FIELD OF THE INVENTION

The present invention relates to an abnormality diagnosis system for an internal combustion engine for diagnosing the presence or absence of an abnormality in an actuator, which is provided to control a controlled variable of an object to be controlled to a desired quantity when fuel is converted to the rotational energy of an internal combustion engine. The present invention also relates to a control system for an internal combustion engine.

BACKGROUND OF THE INVENTION

For example, as disclosed in U.S. Pat. No. 5,491,631 (JP 5-172705A), an abnormality diagnosis system is proposed to diagnose the presence or absence of an abnormality in an actuator of an internal combustion engine while communicating with an electronic control unit of an internal combustion engine. Specifically, in this abnormality diagnosis system, a valve angle command is issued to an exhaust gas recirculation (EGR) valve for controlling the cross-sectional area of an exhaust recirculation passage (EGR passage) for recirculating exhaust gas from an exhaust system of the internal combustion engine to an intake system, and it is determined that the EGR valve is abnormal when the EGR valve is not opened after a specified period. Thus, the presence or absence of an abnormality in the operation of angle the EGR valve can be diagnosed.

In this diagnostic method, an operating signal is outputted to an actuator of an object to be diagnosed, and then at a specified moment after a specified period the presence or absence of an abnormality in the actuator is diagnosed based on the state of the actuator. Thus, the presence or absence of an abnormality in the actuator cannot be determined in a transition period from an operating command is issued to the actuator until the actuator finishes a desired operation. For this reason, an abnormality that the change of the actuator in the transition period until the actuator finishes the desired operation, that is, an abnormality in response characteristic cannot be appropriately detected.

SUMMARY OF THE INVENTION

It is therefore an object of the present invention to provide an abnormality diagnosis system that can diagnose the presence or absence of an abnormality in the response characteristic of an actuator operated to control a controlled variable of an object to be controlled when fuel is converted to the rotational energy of an internal combustion engine to a desired quantity, and a control system for an internal combustion engine.

According to one aspect of the present invention, change of an operating quantity or a controlled variable of an actuator is monitored in a process changing to a target value of the operating quantity or the controlled variable under condition in which the target value is changed, and the presence or absence of an abnormality in a response characteristic of the actuator is determined based on the monitored change.

When the target value (command value) of the operating quantity of the actuator is changed, an actual operating quantity is changed toward a change in the target value (command value) with a delay to the change. Moreover, when the target value of the controlled variable of the object to be controlled is changed, the actuator is controlled so as to make the controlled variable follow the target value. For this reason, an actual controlled variable is changed toward the change in the target value with a delay to the change. Here, the presence or absence of an abnormality in the response characteristic of the actuator is determined by monitoring the change of the operating quantity or the controlled variable in the process changing to the target. Thus, it is possible to appropriately determine the presence or absence of an abnormality that the operating quantity or the controlled variable shows a change out of the scope of assumption in the process in which the operating quantity or the controlled variable changes to the target and, by extension, to appropriately determine the presence or absence of an abnormality in the response characteristic of the actuator.

BRIEF DESCRIPTION OF THE DRAWINGS

The above and other objects, features and advantages of the present invention will become more apparent from the following detailed description made with reference to the accompanying drawings. In the drawings:

FIG. 13 is a flow chart showing the processing of diagnosing the presence or absence of a throttle valve in the fifth embodiment.

DETAILED DESCRIPTION OF THE PREFERRED EMBODIMENTS

First Embodiment

Figure 1:
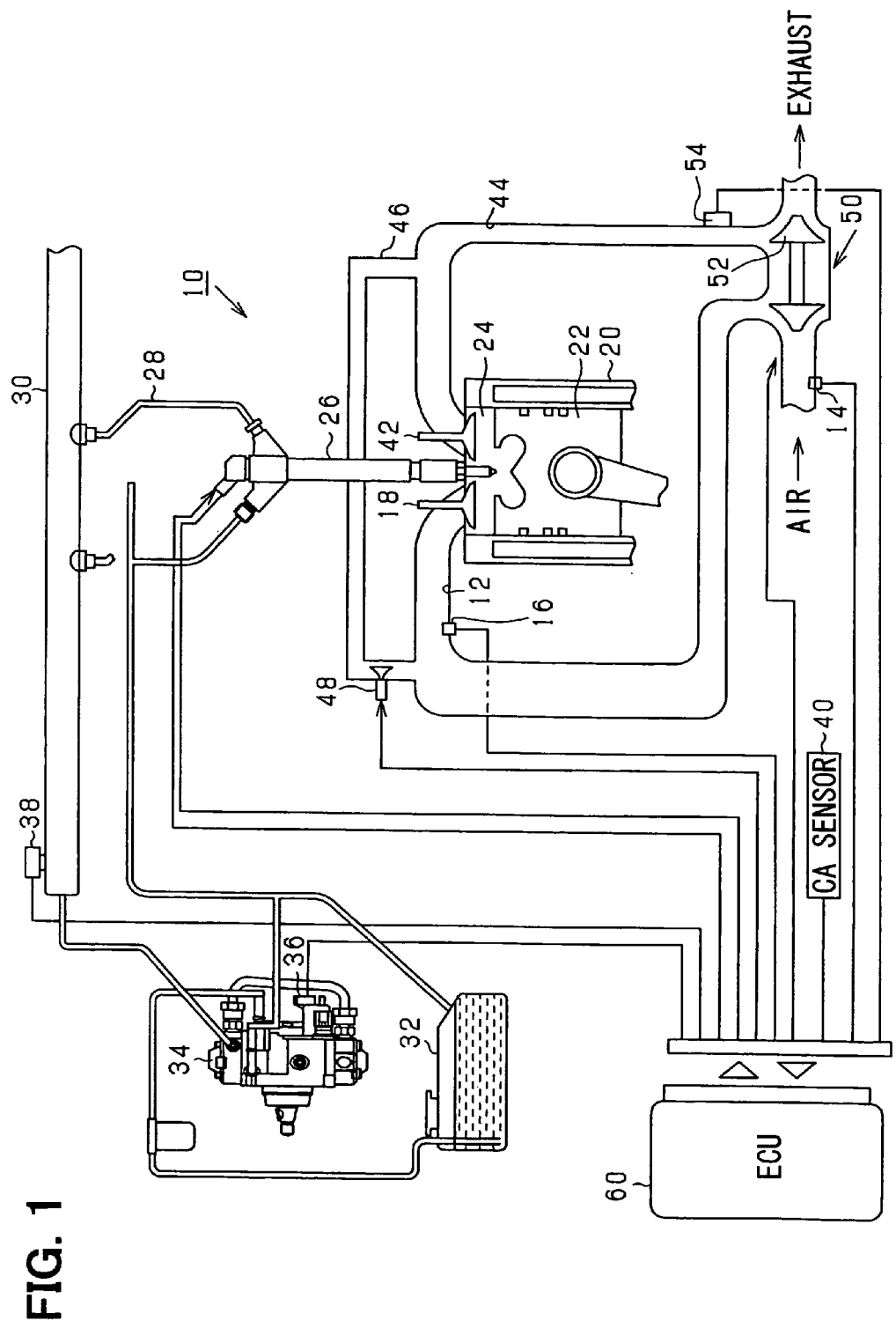
FIG. 1 is a schematic diagram showing an engine system incorporating a first embodiment of the present invention.

Referring first to FIG. 1 showing an engine system, an air flowmeter 14 for detecting an intake air quantity is disposed upstream of an intake passage 12 of a diesel engine 10. An intake air pressure sensor 16 for detecting pressure in the intake passage 12 (intake air pressure) is disposed downstream of the air flowmeter 14. The intake passage 12 is made to connect with a combustion chamber 24 partitioned by a cylinder block 20 and a piston 22 by the angle operation of an intake valve 18. The tip portion of a fuel injection valve 26 is disposed in a protruding manner in the combustion chamber 24 so that fuel can be injected and supplied into the combustion chamber 24.

Fuel is supplied to the fuel injection valve 26 from a common rail 30 through a high-pressure fuel passage 28. The common rail 30 is an accumulator chamber that accumulates the fuel in a high-pressure state and is common to respective cylinders. The fuel is pressure-fed by a fuel pump 34 from a fuel tank 32. The fuel pump 34 is provided with a fuel metering valve 36 so that the quantity of fuel pressure-fed to the common rail 30 is controlled by the metering valve 36. For this reason, the pressure of the fuel in the common rail 30 can be controlled according to the quantity of fuel to be pressure-fed. The common rail 30 is provided with a fuel pressure sensor 38 for detecting internal pressure.

When the fuel is injected into the combustion chamber 24, the fuel is self-ignited by the compression of the combustion chamber 24 to produce energy. This energy is taken out as the rotational energy of an output shaft (crankshaft) of the diesel engine 10 via the piston 22. A crankshaft angle sensor 40 for detecting the rotational angle of the crankshaft is disposed near the crankshaft.

The fuel in the common rail 30 is injected into the combustion chamber 24 via the fuel injection valve 26 to develop combustion and then gas supplied to the combustion is discharged as exhaust gas into an exhaust passage 44 by the angle operation of an exhaust valve 42.

An exhaust gas recirculation (EGR) passage 46 for recirculating the exhaust gas in the exhaust passage 44 to the intake passage 12 is interposed between the exhaust passage 44 and the intake passage 12. The EGR passage 46 is provided with an EGR valve 48 for controlling its cross-sectional passage area. The exhaust passage 44 and the intake passage 12 are provided with a variable nozzle type turbocharger 50. The variable nozzle type turbocharger 50 is electrically driven to control the flow characteristics of the exhaust gas upstream of a turbine wheel 52 by a control valve device 54.

An electronic control unit (ECU) 60 is constructed of a microcomputer and the like. The ECU 60 receives output signals of various sensors in an engine system and an output signal of an accelerator sensor for detecting the operating quantity of an accelerator pedal, and drives various actuators of the diesel engine 10 such as the fuel injection valve 26 and the metering valve 36 based on the sensor outputs, thereby controlling the combustion of the diesel engine 10. At this time, the ECU 60 performs the processing of feedback control so that the detection value of the fuel pressure sensor 38 (actual fuel pressure) is controlled to a target value (target fuel pressure).

Figure 2:
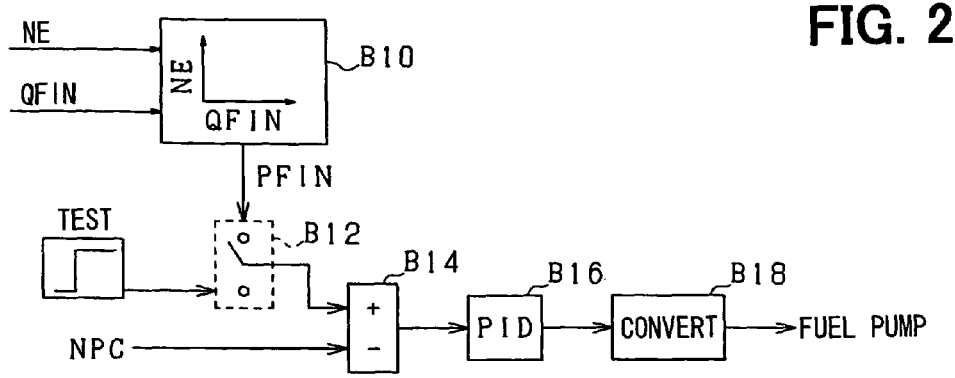
FIG. 2 is a block diagram relating to the processing of feedback control of fuel pressure in the first embodiment.

Of the processing performed by the ECU 60, processing relating to the control of the fuel pressure in the common rail 30 is shown in FIG. 2.

A target fuel pressure setting section B10 sets a target fuel pressure PFIN based on the operating state of the diesel engine 10. That is, the target fuel pressure setting section B10 sets the target fuel pressure PFIN based on the rotational speed NE according to the detection value of the crankshaft angle sensor 40 and an injection quantity QFIN by the fuel injection valve 26.

A selecting section B12 outputs the target fuel pressure PFIN set by the target fuel pressure setting section B10 at the time of a normal operation. A difference computing section B14 computes a difference between the target fuel pressure PFIN outputted by the selecting section B12 and the detection value of the fuel pressure sensor 38 (actual fuel pressure NPC).

A feedback quantity computing section B16 computes the feedback operating quantity of the fuel pump 34 based on the output of the difference computing section B14. Specifically, the feedback quantity computing section B16 computes a command value of a discharge quantity (command discharge quantity) to the fuel pump 34 as a feedback operating quantity by a proportional and integral and differential (PID) control.

A drive current converting section B18 is a section for converting the command discharge quantity to an electric signal of an actual operating signal of the fuel pump 34 (metering valve 36).

With the above processing, the fuel pump 34 (metering valve 36) can be operated, and hence the fuel pressure in the common rail 30 can be fed back to the target fuel pressure. At this time, the controllability of the fuel pressure in the common rail 30 can be kept at a high level by matching a gain in the feedback quantity computing section B16.

However, for example, when the response characteristic of the fuel pump 34 is deteriorated, for example, because of the faulty sliding of a spool of the metering valve 36, the controllability of the fuel pressure in the common rail 30 is decreased. For this reason, in this embodiment, the diagnosis of the presence or absence of an abnormality in the response characteristic of the fuel pump 34 is made by changing the target fuel pressure PFIN to a test target fuel pressure at the time of a test mode under a specific condition. Specifically, the selecting section B12 selects the test target fuel pressure, which is set to increases stepwise, whereby the above diagnosis is made.

Figure 3A:
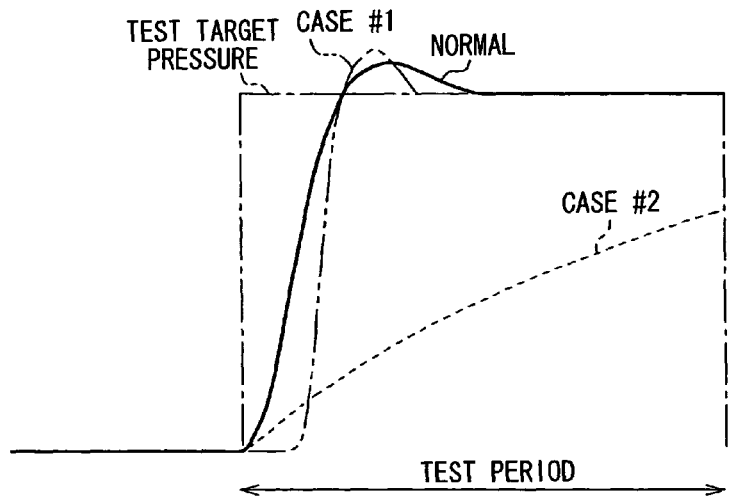
FIGS. 3A and 3B are time charts showing the response characteristic of a fuel pump in the first embodiment.

In FIG. 3A, a single dot and dash line shows the change of the test target fuel pressure at the time of the test mode and a solid line shows the change (behavior) of the fuel pressure in the common rail 30, when the fuel pump 34 operates normally. In contrast, a double dot and dash line (case #1) and a broken line (case #2) show the changes of the fuel pressure in the common rail 30 when the fuel pump 34 operates abnormally.

In the case #1 shown by the double dot and dash line, the time when the discharge quantity of the fuel pump 34 increases is delayed relative to the test target fuel pressure, for example, by the faulty sliding of the spool of the metering valve 36. In this case #1, an integral term is increased because the time when the discharge quantity of the fuel pump 34 increases is delayed, so thereafter an increase in the discharge quantity becomes larger than that when the response characteristic of the fuel pump 34 is normal. For this reason, when the case #1 is compared with a case where the response characteristic of the fuel pump 34 is normal, there is no difference in the time required for the actual fuel pressure to reach the target fuel pressure. However, when the case #1 is compared with a case where the response characteristic of the fuel pump 34 is normal, the quantity of overshoot caused after the actual fuel pressure reaches the target fuel pressure also becomes larger in the case #1.

In contrast, in the case #2 shown by the broken line, the fuel pressure in the common rail 30 shows that a speed of increase of the discharge quantity is decreased as if the gain of feedback control is made excessively small. Thus, the actual fuel pressure does not reach the target fuel pressure within the period of the test mode.

Here, when the response characteristic of the fuel pump 34 is normal, if the period of the test mode is not made excessively longer than the time required for the actual fuel pressure to reach the target fuel pressure, the abnormality of the case 2 can be detected based on whether or not the actual fuel pressure follows the target fuel pressure within the period of the test mode. However, the abnormality of the case #1 cannot be detected by this method. In particular, as to the case #1, its abnormality (delay of rise of fuel pressure) cannot be detected even by detecting the time required for the actual fuel pressure to reach the target fuel pressure.

Therefore, in this embodiment, the presence or absence of an abnormality in the response characteristic of the fuel pump 34 is determined based on the change of the actual fuel pressure in the process in which the actual fuel pressure changes to the target fuel pressure. Specifically, the presence or absence of an abnormality is determined based on a time-change of the actual fuel pressure, that is, a differential value (dNPC/dt) with respect to time of the actual fuel pressure. This method for determining the presence or absence of an abnormality is shown in FIG. 3B.

The normal range and the abnormal range of a maximum value of the differential value (dNPC/dt) with respect to time of the actual fuel pressure is defined. As shown by a solid line in FIG. 3B, when the response characteristic of the fuel pump 34 is normal, the maximum value of a differential value with respect to time of the actual fuel pressure NPC is within the normal range. In the abnormal case (case #1 ), the maximum value becomes a value larger than the normal range. In the abnormal case (#2 ), the maximum value remains smaller than the normal range. In this manner, the presence or absence of an abnormality in the response characteristic of the fuel pump 34 can be determined appropriately by the use of the differential value with respect to time of the actual fuel pressure.

Figure 3B:
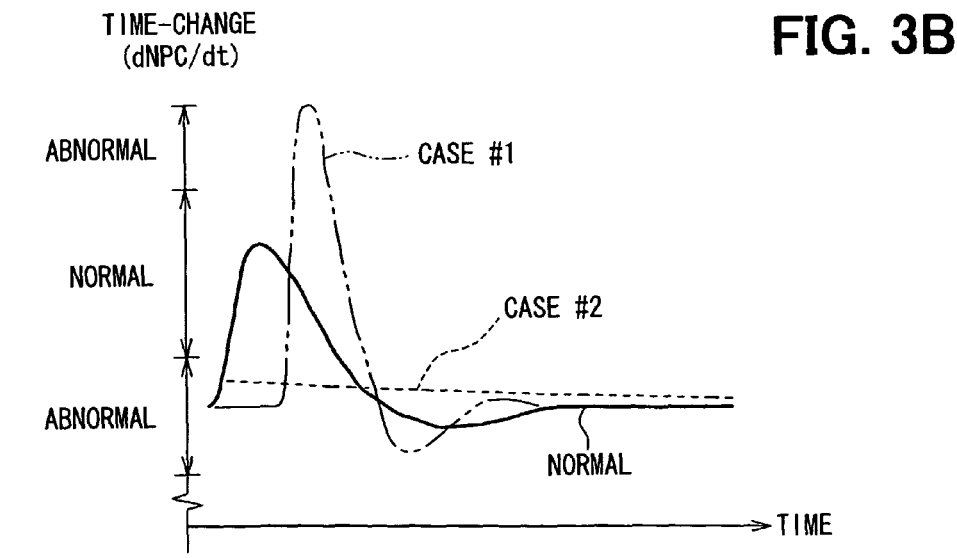

The normal range shown in FIG. 3B is set in advance based on the detection value of the actual fuel pressure when the feedback control of the fuel pressure, shown in FIG. 2, is performed by the use of the normal fuel pump 34. At this time, it is preferable that the normal range is set by the use of various allowable discharge characteristics resulting from the individual variation of the fuel pump 34. Here, it suffices to set the upper limit and the lower limit of the normal range by the use of a fuel pump having the highest allowable response characteristic and a fuel pump having the lowest allowable response characteristic. However, it is desirable that the normal range is set in consideration of also variations in factors other than a factor in the structure of the fuel pump 34. These factors include, for example, the property of fuel to be used, the temperature of the fuel, atmospheric pressure, and the like.

Figure 4:
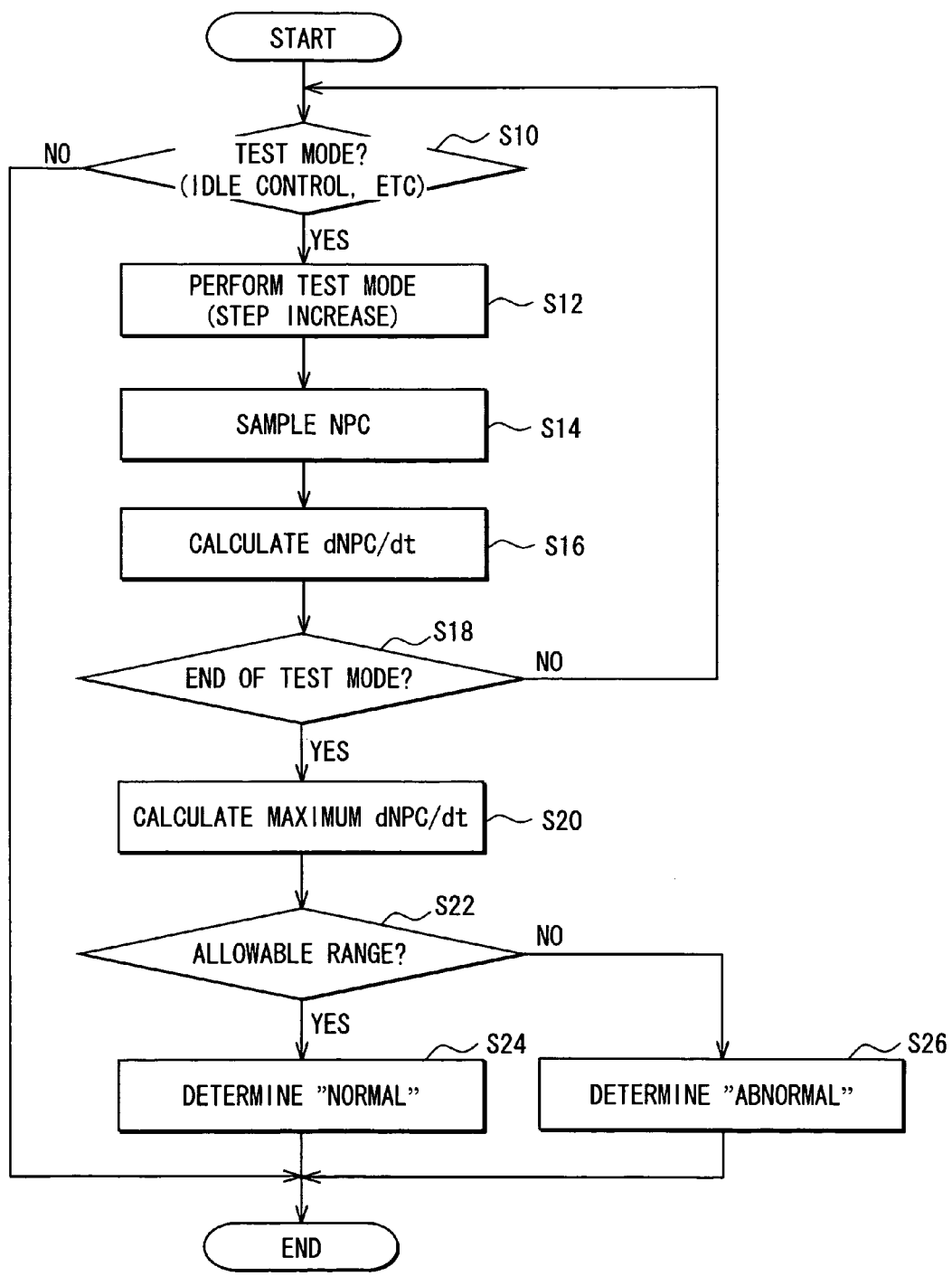
FIG. 4 is a flow chart showing the processing of diagnosing the presence or absence of an abnormality in the fuel pump in the first embodiment.

The processing of diagnosing the presence or absence of an abnormality in the response characteristic of the fuel pump 34 is shown in FIG. 4. This processing is performed repeatedly, for example, at a specified interval by the ECU 60.

First, it is checked in step S10 whether or not the performance condition of the test mode is satisfied. It is assumed to be the performance condition that the engine is controlled under idle speed control. This is because of increasing the frequency of diagnosis of the presence or absence of an abnormality. When it is determined that the performance condition of the test mode is satisfied, the test mode is started and performed in step S12. That is, the target fuel pressure is increased stepwise. In the subsequent step S14, the actual fuel pressure NPC is detected plural times by the fuel pressure sensor 38. Here, it is preferable that an interval between detections is set to a time interval shorter than the time required for the actual fuel pressure to reach the target fuel pressure when the normal fuel pump 34 is used. With this, it is possible to make the diagnosis of the presence or absence of an abnormality based on the detection value of the actual fuel pressure before the actual fuel pressure reaches the target fuel pressure.

In the subsequent step S16, a differential value (dNPC/dt) with respect to time (t) of the actual fuel pressure (NPC) is computed. Specifically, the processing in these steps S14 and S16 are performed in the manner shown in FIG. 5. That is, the output signal (pressure signal) of the fuel pressure sensor 38 is inputted to a filter circuit 62 in the ECU 60. The output of the filter circuit 62 is converted to digital data by an A/D converter 64. If necessary, the digital data is further passed through a filtering processing section B20 for subjecting the digital data to filtering processing by software and then is differentiated by a differentiation section B22.

Figure 6:
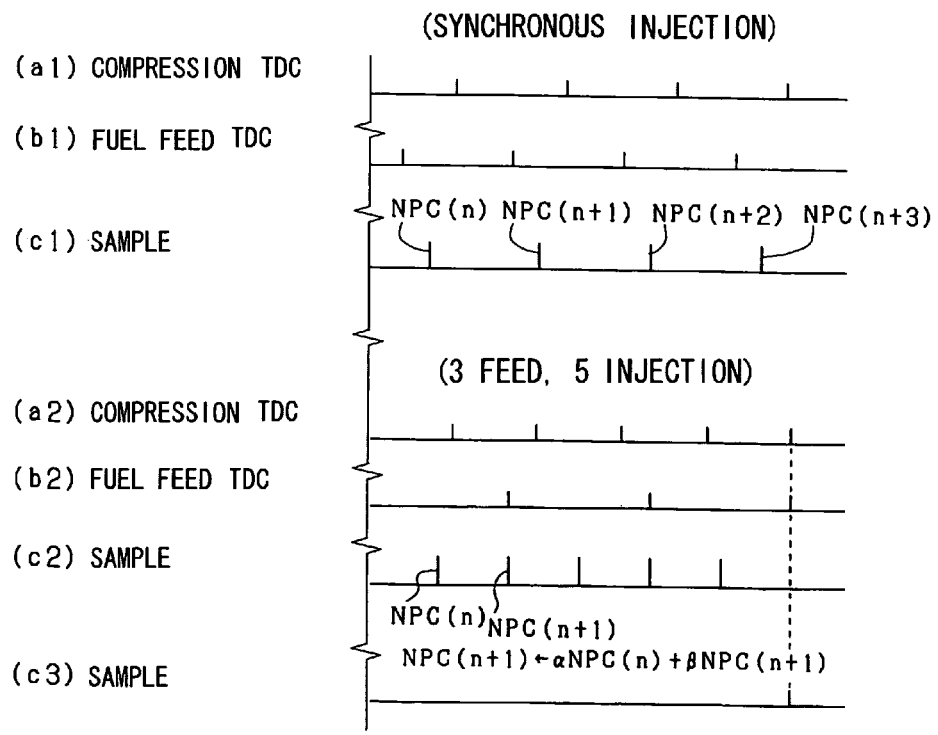
FIG. 6 is a time chart showing a method for removing small variations in fuel pressure from actual fuel pressure in the first embodiment.

In FIG. 6 are shown a sampling mode performed by the A/D converter 64 and the mode of the filtering processing performed by the filtering processing section B20.

In FIG. 6, (a1) shows a compression top dead center (TDC) of each cylinder, (b1) shows a pressure feed top dead center of a plunger of the fuel pump 34, and (c1) shows sampling time point of the fuel pressure by the A/D converter 64. These (a1), (b1) and (c1) show a case of a synchronous fuel injection case in which the injection of fuel is in a one-to-one correspondence with the pressure feed of the fuel. In this case, the fuel pressure is sampled at the time point when the actual fuel pressure is stable in a period that passes after the fuel is pressure-fed until the fuel is injected. Thus, the influence of variations in the actual fuel pressure, which are caused by a decrease in the actual fuel pressure which is caused by the pressure feed of the fuel and an increase in the actual fuel pressure which is caused by the injection of the fuel, can be appropriately removed. As a result, the differential value dNPC/dt with respect to time of the actual fuel pressure can be computed with the least fuel pressure variations.

In FIG. 6, (a2), (b2) and (c2) show a case of an asynchronous fuel injection case, in which the injection of fuel is not in a one-to-one correspondence with the pressure-feed of the fuel. For instance, it is assumed in a five-cylinder internal combustion engine that a pressure feed period is 240° crankshaft angle (CA) and a fuel injection period is 144° CA. In this case, when the actual fuel pressure NPC is sampled at intervals of the fuel injection period (144° CA), the sampled actual fuel pressure is greatly affected by the time difference between the time point of sampling the actual pressure NPC and the time point of pressure-feeding the fuel. Moreover, when the actual fuel pressure is sampled at intervals of pressure feed (240° CA), the sampled actual fuel pressure is greatly affected by the time difference between the time point of sampling the actual pressure NPC and the time point of injecting the fuel. For this reason, the differential value (dNPC/dt) with respect to time of the actual fuel pressure is affected by not only the response characteristic of the fuel pump 34 but also variations in the fuel pressure in the common rail 30 caused by the injection of the fuel.

Figure 5:
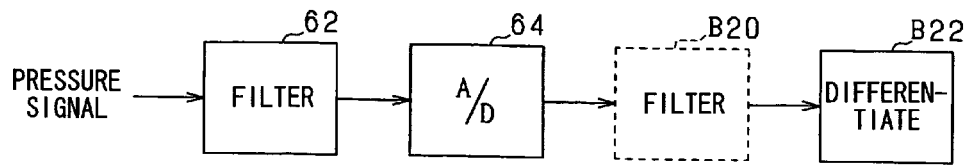
FIG. 5 is a block diagram showing the processing of differentiating actual fuel pressure with respect to time in the first embodiment.

For this reason, as shown by 6(c2), the digital data of the actual fuel pressure NPC is further subjected to filtering processing by the digital filtering processing section B20 shown in FIG. 5. Here is shown a case in which both of the last actual fuel pressure and this sampled value of the actual fuel pressure are multiplied by coefficients A, B (A+B=1), respectively, and in which the values multiplied by coefficients A, B are then added to each other to compute this actual fuel pressure, that is, a case in which the sampled data of the actual fuel pressure is subjected to the weighted average processing. Moreover, (c3) shows an example, in which in place of the case shown in (c2), the actual fuel pressure NPC is sampled at intervals of 720° CA which is the least common multiple of the period of injecting the fuel and the period of pressure-feeding the fuel. In this manner, even by setting the least common multiple of the period of injecting the fuel and the period of pressure-feeding the fuel to the sampling period of the actual fuel pressure, the influence of variations in the fuel pressure in the common rail 30 caused by the injection of the fuel can be removed from the differential value dNPC/dt with respect to time of the actual fuel pressure.

In step S18 shown in FIG. 4, it is checked whether or not the test mode is finished. Here, it suffices to check whether or not a specified period of the test mode passes after the target fuel pressure is increased stepwise. When the test mode is not yet finished, the routine returns to step S10.

When it is determined that the test mode is finished, in step S20, the maximum value of the differential value (dNPC/dt) with respect to time of the actual fuel pressure is computed. In the subsequent step S22, it is checked whether or not the maximum value of the differential value with respect to time of the actual fuel pressure is within the allowable range (normal range) shown in FIG. 3B. Here, the normal range shown in FIG. 3B is set in consideration of actual feedback control (control shown in FIG. 2). Further, in the case of using the analog filter circuit 62 and the digital filtering processing section B20 shown in FIG. 5, there is set a normal range for the differential value with respect to time of the actual fuel pressure when the sampled value is subjected to the same filtering processing.

When it is determined in step S22 that the maximum value of the differential value (dNPC/dt) with respect to time of the actual fuel pressure is within the allowable range, it is determined in step S24 that the fuel pump 34 operates normally. In contrast, when it is determined in step S22 that the maximum value of the differential value (dNPC/dt) with respect to time of the actual fuel pressure is out of the allowable range, it is determined in step S26 that there is an abnormality in the response characteristic of the fuel pump 34.

Here, when the processing in step S24 or step S26 is finished or when a negative determination (NO) is made in step S10, this series of processing are once finished.

According to this first embodiment, the following effects can be produced.

(1) The presence or absence of an abnormality in the response characteristic of the fuel pump 34 is determined based on the change of the actual fuel pressure in the process in which the actual fuel pressure changes to the target fuel pressure. With this, it is possible to determine the presence or absence of an abnormality relating to the response characteristic of the fuel pump 34 in a more appropriate manner.

(2) A change with respect to time of the actual fuel pressure is quantified based on the detection value of the actual fuel pressure before reaching the target fuel pressure. With this, it is possible to make this change with respect to time of the actual fuel pressure appropriate in determining the presence or absence of an abnormality in the response characteristic of the fuel pump 34.

(3) It is possible to evaluate the response characteristic of the fuel pump 34 in an appropriate manner by quantifying a change with respect to time of the actual fuel pressure by the maximum value of the differential value with respect to time of the actual fuel pressure in a specified period.

(4) The presence or absence of an abnormality in the response characteristic of the fuel pump 34 is diagnosed by performing the test mode for forcibly changing the target fuel pressure. With this, it is possible to increase the frequency of the diagnosis of the presence or absence of an abnormality in the response characteristic of the fuel pump 34.

Second Embodiment

Figure 7:
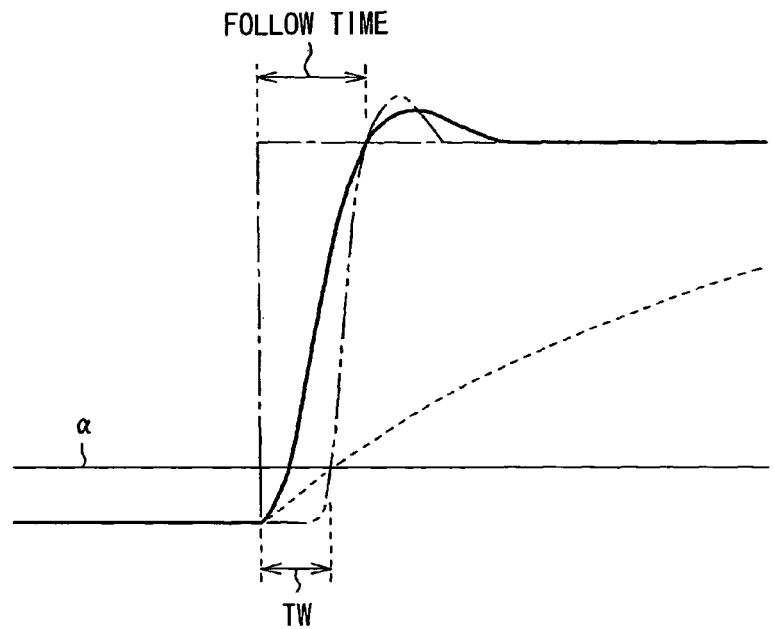
FIG. 7 is a time chart showing a method for determining the presence or absence of an abnormality in response characteristic according to a second embodiment of the present invention.

In a second embodiment, as shown in FIG. 7, the presence or absence of an abnormality is diagnosed based on both of a dead time TW that passes after the target fuel pressure (single dot and chain line) increases stepwise until the actual fuel pressure (solid line) increases and a follow time required for the actual fuel pressure to reach the target fuel pressure (time required to follow). Here, the detection of the time the actual fuel pressure starts to increase is difficult because of the influence of noises and the like. Therefore, the time that passes after the target fuel pressure increases stepwise until the actual fuel pressure reaches a specified pressure a is defined as the dead time TW. By setting normal ranges also for the dead time and the time required to follow in the same manner as in the first embodiment, it is possible to diagnose the presence or absence of an abnormality in the response characteristic of the fuel pump 34.

The above effects (1), (2), and (4) of the first embodiment can be provided even by this second embodiment.

Third Embodiment

Figure 8:
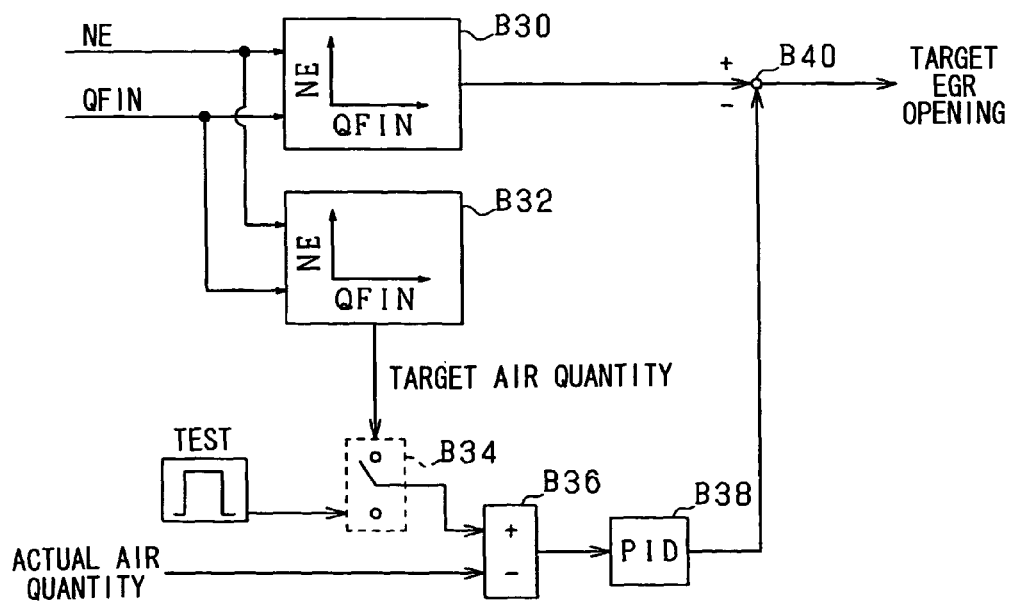
FIG. 8 is a block diagram showing the processing of feedback control of an intake air quantity according to a third embodiment of the present invention.

In a third embodiment, as shown in FIG. 8, a base angle setting section B30 sets a base value (base angle) of angle of the EGR valve 48 based on the operating state of the diesel engine 10. Specifically, the base angle is set, for example, by map computation based on the rotational speed NE of the engine 10 and the injection quantity QFIN of the fuel injection valve 26.

A target intake air quantity setting section B32 sets a target value of an intake air quantity based on the operating state of the diesel engine 10. Specifically, a target intake air quantity is set, for example, by map computation based on the rotational speed NE of the engine 10 and the injection quantity of the fuel injection valve 26.

A selecting section B34 selectively outputs the output of the target intake quantity setting section B32 in normal times. A difference computing section B36 computes the difference between the intake air quantity (actual intake air quantity) detected by the air flowmeter 14 and the target intake air quantity outputted by the selecting section B34.

A feedback quantity computing section B38 computes a feedback correction quantity of the EGR valve 48 based on the output of the difference computing section B36. Specifically, the feedback correction quantity is computed based on the proportional and integral and differential (PID) computation of the output.

A final angle computing section B40 corrects the base angle by the feedback correction quantity to compute a final angle command value (target value). With this, the actual intake air quantity can be fed back to the target intake air quantity by the operation of the EGR valve 48.

The selecting section B34 switches its output to the output of the test mode when the presence or absence of an abnormality in the response characteristic of the EGR valve 48 is diagnosed. A target intake air quantity at the time of the test mode is shown by a single dot and chain line in FIG. 9A. At the time of the test mode, the target intake air quantity is increased stepwise and then fixed for a specified period and then is decreased stepwise. In FIG. 9B is shown the normal range of a time change of the actual intake air quantity, that is, a differential value with respect to time of an actual intake air quantity in the test period, which continues after a stepwise change in the target intake air quantity starts and then finishes when the specified period of time passes.

In this embodiment, to increase the target intake air quantity and then to decrease it, normal ranges are set for the maximum value and the minimum value of the differential value with respect to time of the actual fuel pressure. These normal ranges are set in the same manner as in the first embodiment.

Figure 10:
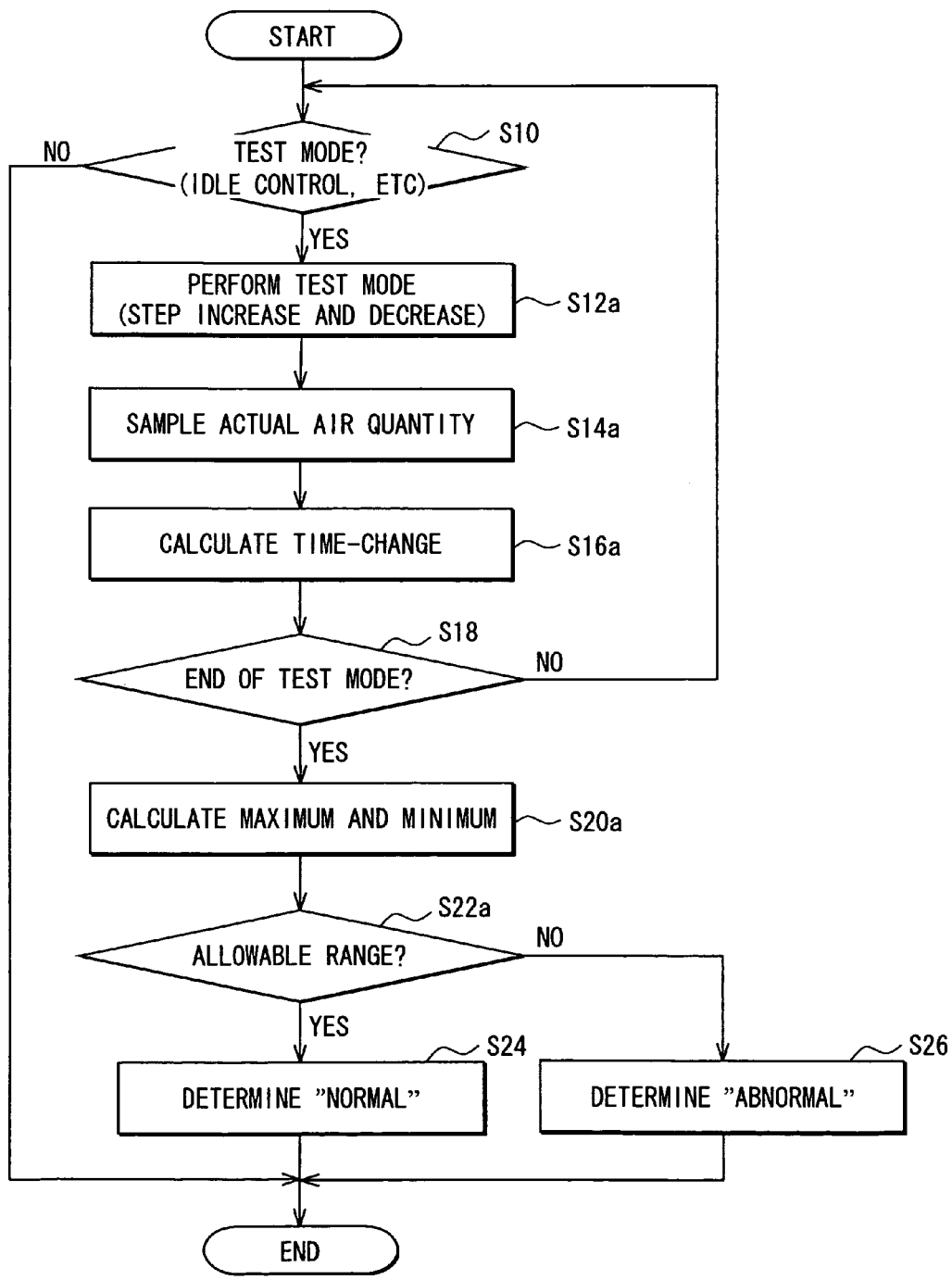
FIG. 10 is a flow chart showing the processing of diagnosing the presence or absence of an abnormality in an EGR valve in the third embodiment.

The processing of diagnosing the presence or absence of an abnormality in the response characteristic of the EGR valve 48 according to this embodiment is shown in FIG. 10. This processing is performed repeatedly, for example, at a specified interval by the ECU 60. Here, in FIG. 10, the processings corresponding to the processings shown in FIG. 4 are denoted by the same reference numbers for brevity.

Figure 9A:
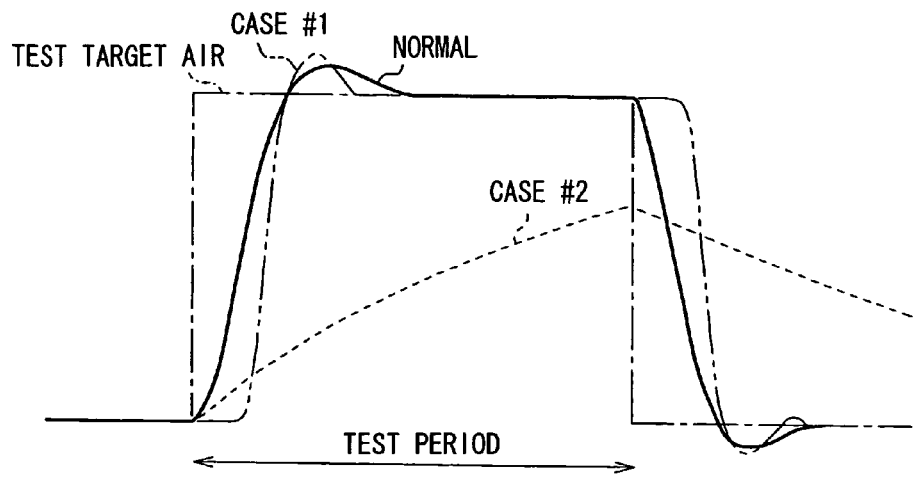
FIGS. 9A and 9B are time charts showing the response characteristic of an intake air quantity in the third embodiment.
Figure 9B:
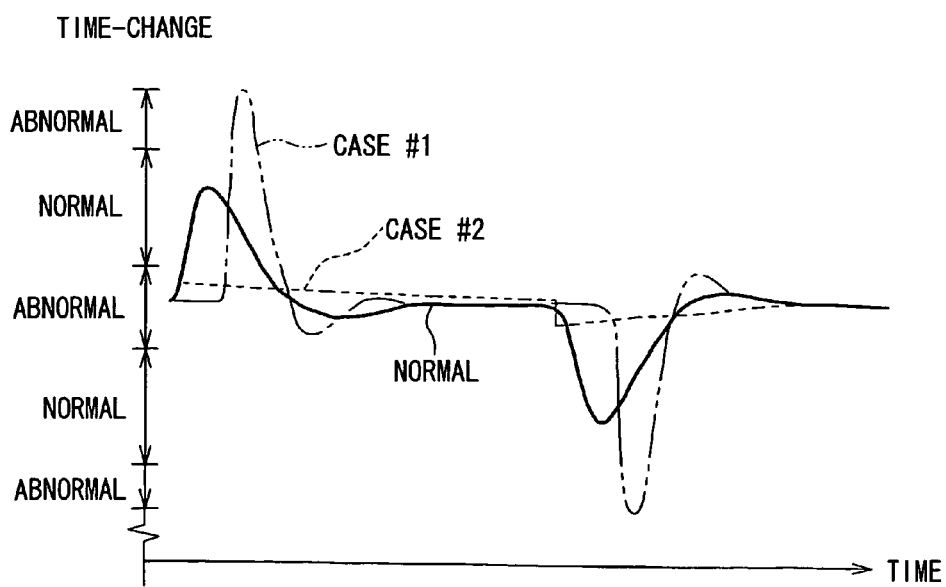

In this series of processing, when the performance condition of the test mode is satisfied in step S10, in step S12$a$ the target intake air quantity is changed in a manner shown in FIG. 9A so as to perform the test mode. In the subsequent step S14$a$, the actual intake air quantity is sampled. Then, in step S16$a$, the time-change, that is, differential value with respect to time of the actual intake air quantity is computed. When it is determined that the test mode is finished (step S18: YES), the maximum value and the minimum value of the differential value with respect to time of the actual intake air quantity are computed. Then, it is determined in step S22$a$ whether or not the maximum value and the minimum value are within the allowable range (normal range shown in FIG. 9B).

As to the setting of the angle of the EGR valve 48 at the time of the test mode, the EGR valve 48 does not need to be set in the manner shown in FIG. 8. For example, the angle of the EGR valve 48 may be set only by the feedback quantity computing section B38 without using the base angle setting section B30. However, in this case, the normal range shown in FIG. 9B is assumed to be a normal range in the case in which the angle of the EGR valve 48 is set only by the feedback quantity computing section B38.

According to this third embodiment, when the presence or absence of an abnormality in the response characteristic of the EGR valve 48 is diagnosed, advantages similar to those of the first embodiment can be provided.

Fourth Embodiment

Figure 11:
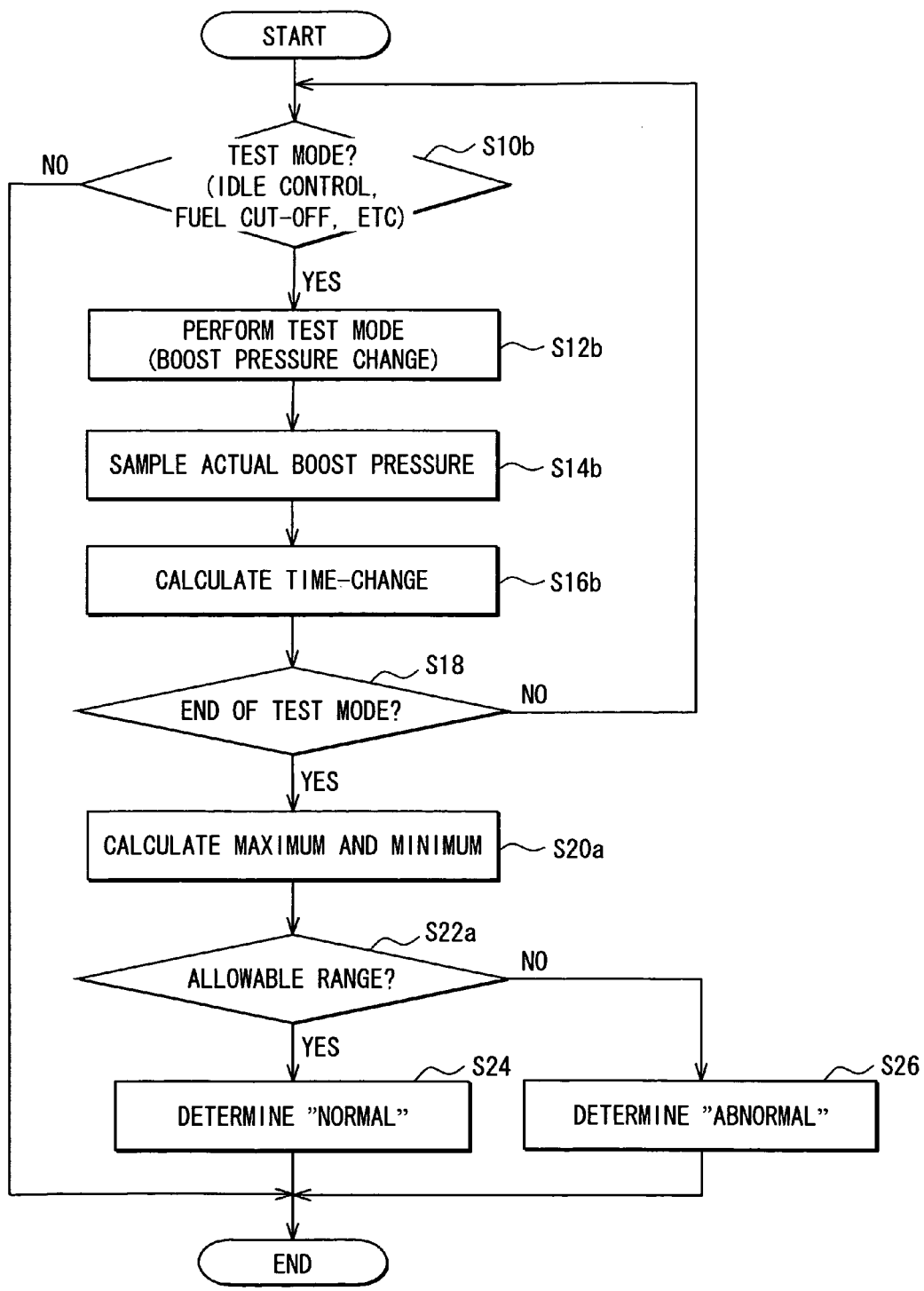
FIG. 11 is a flow chart showing the processing of diagnosing the presence or absence of an abnormality in a variable nozzle type turbocharger according to a fourth embodiment of the present invention.

In a fourth embodiment, the presence or absence of an abnormality in the response characteristic of the variable nozzle type turbocharger 50 is diagnosed. The processing of diagnosing the presence or absence of this abnormality is shown in FIG. 11. This processing is performed repeatedly, for example, at a specified interval by the ECU 60. Here, in FIG. 11, the processing corresponding to the processing shown in FIG. 10 are denoted by the same reference numbers for brevity.

In this series of processing, first, it is checked in step S10$b$ whether or not the performance condition of the test mode is satisfied. Here, it is assumed to be the performance condition that the engine 10 is operated under idle speed control or fuel cut-off control. When it is determined that the performance condition of the test mode is satisfied, the test mode is performed in step 512$b$. Here, the target value of boost (turbocharged) pressure is changed. Specifically, when the engine 10 is operated under the idle speed control, for example, as shown in FIG. 9A, it suffices to increase the target value stepwise and then to decrease the target value stepwise. Moreover, when the engine is operated under the fuel cut-off control, it suffices to relax the degree of a decrease in the target value incident to a shift to the fuel cut-off control or to increase the target value. In this step S12$b$, the turbocharger 50 is electrically driven to control flow characteristic of exhaust gas upstream of the turbine wheel 52 by an electrically-controlled valve device 54 disposed in the exhaust system 44, so that the target boost pressure may be attained.

In the subsequent step S14$b$, the detection value (actual boost pressure) of the intake air pressure sensor 16 shown in FIG. 1 is acquired. Then, in step S16$b$, the time-change, that is, differential value with respect to time of the actual boost pressure, is computed. At this time, preferably, the influence of pressure pulsation in the intake passage 12 may be removed by filtering in the same manner as in the first embodiment and then the differential value with respect to time of the actual boost pressure is computed. When the test mode is finished (step S18: YES), the maximum value and the minimum value of the differential value with respect to time of the actual boost pressure are computed in step S20$a$. Here, for example, when the target value is increased or decreased by performing the test mode at the time of the idle speed control, the maximum value and the minimum value of the differential value with respect to time of the actual boost pressure are computed. On the other hand, when the degree of a decrease in the actual boost pressure is suppressed by performing the test mode at the time of the fuel cut-off control, the maximum value of the differential value with respect to time of the actual boost pressure is computed.

In the subsequent step S22$a$, it is checked whether or not the differential value with respect to time of the actual boost pressure is within the allowable range computed in the step S20$a$. Here, the allowable range can be set in the same manner as in the first embodiment. In this respect, a method for setting an operating quantity of the variable nozzle type turbocharger 50 in this test mode does not always need to be the same as that for the usual feedback control of boost pressure. That is, even when a base operating quantity set based on the operating state of the diesel engine 10 (for example, rotation speed and injection quantity) is feedback corrected based on the difference between the actual boost pressure and the target value to perform the usual feedback control of boost pressure, only the feedback control can be used at the time of the test mode. However, in this case, the allowable range is set on the assumption that the operating quantity of the variable nozzle type turbocharger 50 is set only by the feedback control.

According to this fourth embodiment, when the presence or absence or an abnormality in the response characteristic of the variable nozzle type turbocharger 50 is diagnosed, similar advantages as in the first embodiment can be provided.

Fifth Embodiment

Figure 12:
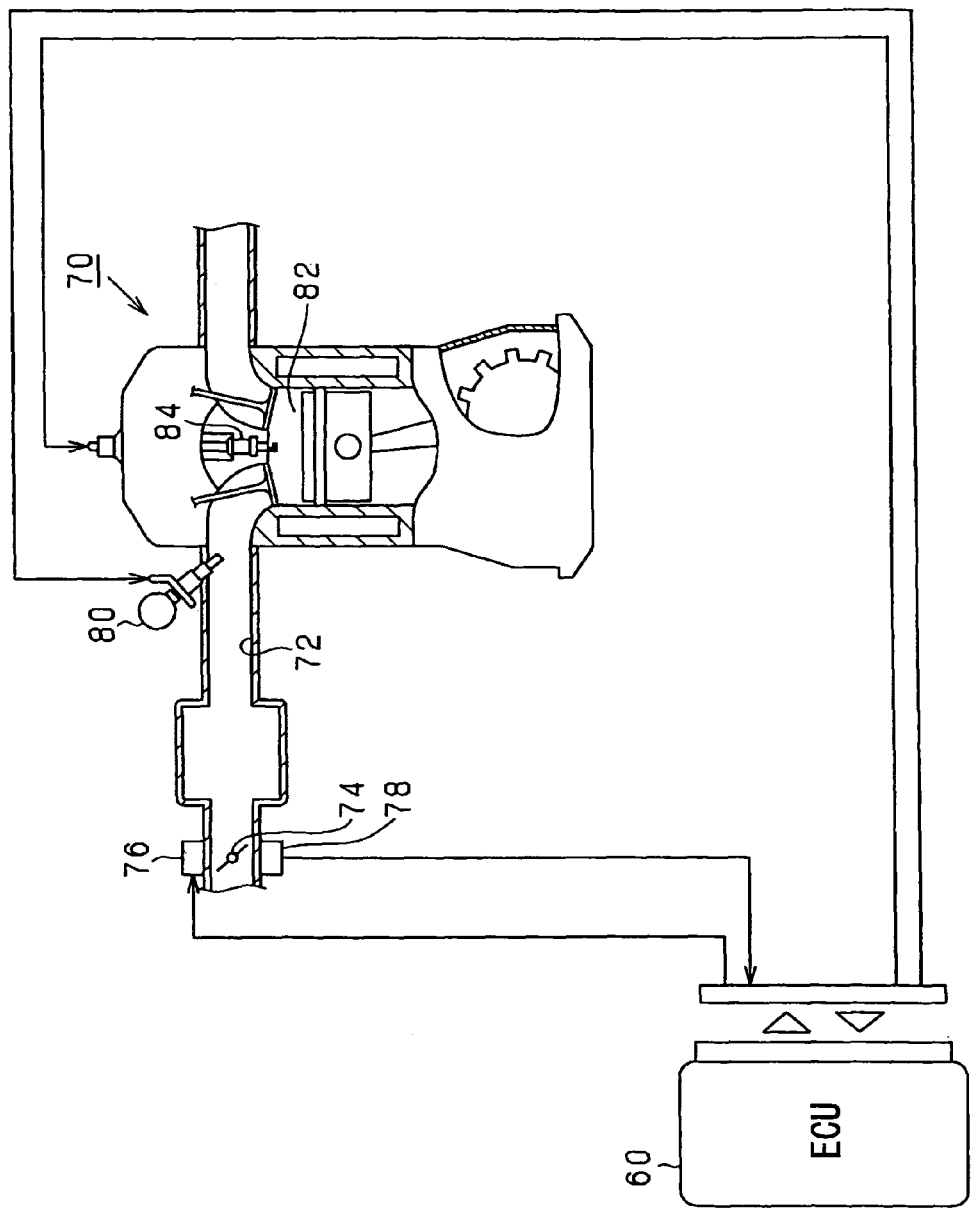
FIG. 12 is a schematic diagram showing an engine system incorporating a fifth embodiment of the present invention.

In a fifth embodiment, as shown in FIG. 12, an intake passage 72 of a gasoline engine 70 is provided with an intake air throttle valve 74 for controlling its cross-sectional passage area. The throttle valve 74 is an electronically controlled valve driven by a motor 76. Moreover, a throttle sensor 78 for detecting the angle of the throttle valve 74 is disposed near the throttle valve 74. Further, the intake passage 72 is provided with a fuel injection valve 80 and a combustion chamber 82 is provided with an ignition plug 84.

To control the torque of the gasoline engine 70 to a desired value, the ECU 60 outputs an operating signal to the motor 76 to operate the angle of the throttle valve 74 and drives the fuel injection valve 80 and the ignition plug 84. In particular, the ECU 60 feedback controls the throttle valve 74 to the target value.

The processing of diagnosing the presence or absence of an abnormality in the throttle valve 74 is shown in FIG. 13. This processing is performed repeatedly, for example, at a specified interval by the ECU 60. Here, in FIG. 13, the processings corresponding to the processing shown in FIG. 10 are denoted by the same step numbers for the sake of convenience.

In this series of processing, when it is determined in step S10 that the performance condition of the test mode is satisfied, the test mode is performed in step S12c. Here, the processing of increasing the target value of a throttle angle stepwise and then decreasing the target value is performed in the similar manner as in the case of the intake air quantity shown in FIG. 9A. At this time, to suppress a change in torque caused by a change in the throttle angle, an ignition time is corrected. That is, the ignition time is delayed when the angle of the throttle valve 74 is increased, and the ignition time is advanced when the angle of the throttle valve 74 is decreased.

In the subsequent step S14c, the actual throttle angle detected by the throttle sensor 78 is acquired. Then, in step S16c, the differential value with respect to time of the detection value of the throttle angle is computed. The next and subsequent processing are the same as those shown in FIG. 10.

According to this fifth embodiment, when the presence or absence or an abnormality in the response characteristic of the throttle valve 74 is diagnosed, similar advantages as in the first embodiment can be provided.

Other Embodiments

The above embodiments may be modified in the following manner.

(a) The method for determining the presence or absence of an abnormality in the response characteristic of an actuator based on the controlled variable (fuel pressure, intake air quantity, boost pressure) of a controlled object using an actuator or a change with respect to time of the operating quantity of the actuator is not always a method based on the maximum value and the minimum value of the differential value, or a method based on the dead time and the time required to follow. For example, the method may be a based on the time when the second differential value with respect to time becomes zero. For example, in the example shown in FIG. 3A, the time when the second differential value with respect to time becomes zero is later in the case #1 of an abnormal case than in the normal case. Moreover, a range before and after a change in the target value of a controlled variable or an operating quantity may be divided into plural ranges and the presence or absence of an abnormality in the response characteristic of the actuator may be determined based on the time required for an actual controlled variable or an actual operating quantity to reach these divided points.

(b) In the second embodiment provided with means for detecting the angle of the EGR valve 48, the presence or absence of an abnormality in the response characteristic of the EGR valve 48 may be determined based on a change with respect to time in the detection value of the operating quantity of the actuator, that is, the angle of the EGR valve 48.

(c) The test mode for diagnosing the presence or absence of an abnormality in an actuator, which is different from a normal operation, is not necessarily limited to examples shown in the embodiments. Here, for example, when the diesel engine 10 or the gasoline engine 70 is an internal combustion engine mounted in a vehicle, it is preferable that the test mode is an operating mode that does not have an influence adversely on the running state of the vehicle.

(d) The test mode different from a normal operation does not necessarily need be provided to diagnose the presence or absence of an abnormality in an actuator, but the presence or absence of an abnormality of in an actuator may be diagnosed when a target value is changed. That is, for example, it is also recommended that in the first embodiment, a diagnosis performance condition is determined by increases in the quantity and the speed of a target fuel pressure. When the actual increase in the quantity and the speed of the target fuel pressure satisfies the diagnosis performance condition, the presence or absence of an abnormality in the actuator is diagnosed. Even in this case, when the increases in the quantity and the speed of the target fuel pressure become the diagnosis performance condition, the allowable range (normal range) can be set from the change of the actual fuel pressure when the normal fuel pump 34 is used. However, at the time of the normal operation, there are more factors affecting the change of the actual fuel pressure than at the time of the idle speed control. It is preferable that these factors are added to the diagnosis performance condition. That is, for example, it can be thought that when an increase in the target fuel pressure is the same, a fuel injection quantity to produce torque of the diesel engine 10 becomes nearly the same. However, depending on the presence or absence of post injection for regeneration control of an after-treatment device disposed in the exhaust system, the change of the actual fuel pressure can be changed. For this reason, it is preferable that only either the presence or absence of the post injection is provided for the diagnosis performance condition or that the allowable range is variably set according to the presence or absence of the post injection.

(e) The feedback control of the controlled variable to the target value or the feedback control of the operating quantity of the actuator to the target value (command value) are not necessarily limited to the proportional and integral and differential (PDI) control based on the difference between the target value and the detection value. However, in the case of the feedback control based on the integrated value of a quantity expressing the degree of each alienation between the target value and the detection value, the detection value tends to change like the case #1 shown in FIGS. 3A and 3B, and FIGS. 9A and 9B, so the application of the present invention can be particularly effective.

(f) An actuator that is an object to have the presence or absence of an abnormality in its response characteristic diagnosed is not necessarily limited to those shown as examples in the respective embodiments. For example, the actuator may be a valve characteristic varying unit for varying the valve characteristic of an intake valve or an exhaust valve such as a valve timing varying unit for controlling the relative rotational phase difference between a camshaft for driving an intake valve and a crankshaft.

What is claimed is:

1. An abnormality diagnosis system for diagnosing abnormality of an internal combustion engine, which has an actuator operable to control a controlled variable of an object to be controlled to a target value, when fuel is converted to rotational energy, the abnormality diagnosis system comprising:

means for changing the target value forcibly; and determination means for determining presence or absence of an abnormality in a response characteristic of the actuator by checking, under a condition that a target value of either one of the operating quantity and the controlled variable is changed, whether a maximum value of a time differential value of a detection value of either one of the operation quantity of the actuator and the controlled variable of the object is within a predetermined normal range defined by an upper limit and a lower limit of the maximum value or whether a minimum value of the time differential value is within a predetermined normal range defined by an upper limit and a lower limit of the minimum value.

2. The abnormality diagnosis system as claimed in claim 1, wherein:

the actuator controls a state quantity of fluid to be supplied to combustion in the internal combustion engine.

3. The abnormality diagnosis system as claimed in claim 2, wherein:

the determination means determines the presence or absence of an abnormality by checking a detection value of the state quantity of fluid under the condition that a target value of the state quantity of fluid is changed.

4. The abnormality diagnosis system as claimed in claim 1, further comprising:

means for feedback-controlling either one of the operating quantity of the actuator and the controlled variable of the object to the target value of the same, the means for feedback-controlling performs feedback control based on an integrated value of a difference between the detection value and the target value of either one of the operating quantity and the controlled variable at each time.

5. The abnormality diagnosis system as claimed in claim 1, wherein:

the internal combustion engine includes a fuel injection valve for injecting fuel accumulated in an accumulator chamber in a state of high pressure;

the actuator is a fuel pump for pressure-feeding the fuel accumulated in the accumulator chamber; and the either one of the operating quantity and the controlled variable is pressure of the fuel in the accumulator chamber as the controlled variable of the object.

6. The abnormality diagnosis system as claimed in claim 1, wherein:

the internal combustion engine includes an exhaust recirculation passage for recirculating exhaust gas of an exhaust system to an intake system, and a valve for controlling a flow area of the exhaust recirculation passage; and the actuator is the valve.

7. The abnormality diagnosis system as claimed in claim 1, wherein:

the internal combustion engine includes a turbocharger capable of controlling flow characteristic of exhaust gas upstream of a turbine wheel disposed in an exhaust system;

the actuator is the turbocharger; and the either one of the operating quantity and the controlled variable is a boost pressure as the controlled variable of the object.

8. A control system for an internal combustion engine comprising:

the abnormality diagnosis system as claimed in claim 1; and the actuator.

9. The abnormality diagnosis system as claimed in claim 2, further comprising:

means for feedback-controlling either one of the operating quantity of the actuator and the controlled variable of the object to the target value of the same, the means for feedback-controlling performs feedback control based on an integrated value of a difference between the detection value and the target value of either one of the operating quantity and the controlled variable at each time.

10. The abnormality diagnosis system as claimed in claim 2, wherein:

the internal combustion engine includes a fuel injection valve for injecting fuel accumulated in an accumulator chamber in a state of high pressure;

the actuator is a fuel pump for pressure-feeding the fuel accumulated in the accumulator chamber; and the either one of the operating quantity and the controlled variable is pressure of the fuel in the accumulator chamber as the controlled variable of the object.

11. The abnormality diagnosis system as claimed in claim 2, wherein:

the internal combustion engine includes an exhaust recirculation passage for recirculating exhaust gas of an exhaust system to an intake system, and a valve for controlling a flow area of the exhaust recirculation passage; and the actuator is the valve.

12. The abnormality diagnosis system as claimed in claim 2, wherein:

the internal combustion engine includes a turbocharger capable of controlling flow characteristic of exhaust gas upstream of a turbine wheel disposed in an exhaust system;

the actuator is the turbocharger; and the either one of the operating quantity and the controlled variable is a boost pressure as the controlled variable of the object.

13. The abnormality diagnosis system as claimed in claim 3, further comprising:

means for feedback-controlling either one of the operating quantity of the actuator and the controlled variable of the object to the target value of the same, the means for feedback-controlling performs feedback control based on an integrated value of a difference between the detection value and the target value of either one of the operating quantity and the controlled variable at each time.

14. The abnormality diagnosis system as claimed in claim 3, wherein:

the internal combustion engine includes a fuel injection valve for injecting fuel accumulated in an accumulator chamber in a state of high pressure;

the actuator is a fuel pump for pressure-feeding the fuel accumulated in the accumulator chamber; and the either one of the operating quantity and the controlled variable is pressure of the fuel in the accumulator chamber as the controlled variable of the object.

15. The abnormality diagnosis system as claimed in claim 3, wherein:

the internal combustion engine includes an exhaust recirculation passage for recirculating exhaust gas of an exhaust system to an intake system, and a valve for controlling a flow area of the exhaust recirculation passage; and the actuator is the valve.

16. The abnormality diagnosis system as claimed in claim 3, wherein:
the internal combustion engine includes a turbocharger capable of controlling flow characteristic of exhaust gas upstream of a turbine wheel disposed in an exhaust system;
the actuator is the turbocharger; and
the either one of the operating quantity and the controlled variable is a boost pressure as the controlled variable of the object.

17. The abnormality diagnosis system as claimed in claim 4, wherein:
the internal combustion engine includes a fuel injection valve for injecting fuel accumulated in an accumulator chamber in a state of high pressure;
the actuator is a fuel pump for pressure-feeding the fuel accumulated in the accumulator chamber; and
the either one of the operating quantity and the controlled variable is pressure of the fuel in the accumulator chamber as the controlled variable of the object.

18. The abnormality diagnosis system as claimed in claim 4, wherein:
the internal combustion engine includes an exhaust recirculation passage for recirculating exhaust gas of an exhaust system to an intake system, and a valve for controlling a flow area of the exhaust recirculation passage; and
the actuator is the valve.

19. The abnormality diagnosis system as in claim 1, wherein the means for changing the target value includes a selecting section, which selects either one of a normal target value set in accordance with engine conditions and a target value set to change stepwisely irrespective of the engine conditions.

* * * * *